United States Patent
Cradick et al.

(10) Patent No.: US 7,836,513 B2
(45) Date of Patent: Nov. 16, 2010

(54) SYSTEM, METHOD, AND COMPUTER PROGRAM PRODUCT FOR SECURE INPUT FOR MOBILE DEVICES

(75) Inventors: Ryan K. Cradick, Rochester, MN (US); Zachary A. Garbow, Rochester, MN (US); Kevin G. Paterson, San Antonio, TX (US)

(73) Assignee: International Business Machines Corporation, Armonk, NY (US)

( * ) Notice: Subject to any disclaimer, the term of this patent is extended or adjusted under 35 U.S.C. 154(b) by 1264 days.

(21) Appl. No.: 11/359,155

(22) Filed: Feb. 22, 2006

(65) Prior Publication Data

US 2007/0198843 A1   Aug. 23, 2007

(51) Int. Cl.
*G06F 7/04* (2006.01)
(52) U.S. Cl. .............................. 726/28; 726/30; 726/17; 726/18; 715/864

(58) Field of Classification Search ................. 713/182; 379/93.08, 373.02; 708/135; 726/1, 36; 380/232, 247, 250; 705/67; 709/225, 226; 455/567, 564, 410, 411, 414.4, 466; 345/121, 345/126

See application file for complete search history.

(56) References Cited

U.S. PATENT DOCUMENTS

| | | | |
|---|---|---|---|
| 7,123,900 B2 * | 10/2006 | Brown et al. | 455/567 |
| 2002/0193080 A1 * | 12/2002 | Komsi et al. | 455/90 |
| 2007/0186192 A1 * | 8/2007 | Wigdor | 715/864 |

* cited by examiner

*Primary Examiner*—Pramila Parthasarathy
(74) *Attorney, Agent, or Firm*—Cantor Colburn LLP; Feb Cabrasawan

(57) ABSTRACT

Exemplary embodiments include a system for secure input for a mobile device including: a input device for receiving an input from a user; a sensor for determining the status of the mobile device; and a processor in operable communication with the input device and the sensor, wherein the processor alters the input received from the user responsive to the status of the mobile device.

13 Claims, 2 Drawing Sheets

US 7,836,513 B2

SYSTEM, METHOD, AND COMPUTER PROGRAM PRODUCT FOR SECURE INPUT FOR MOBILE DEVICES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

The present invention relates to a method and computer program for secure input for a mobile device. More specifically, the present invention relates to a method and computer program product for secure input for a mobile device using a tilt sensor.

2. Description of Background

Many Internet applications such as email, banking, and various other applications require user names and passwords for logging into and accessing websites. Previously, as most Internet accessible devices required a wired connection, passwords could be securely typed with little concern regarding who is watching the typist enter his or her user name and password.

With the proliferation of wireless devices and mobile Internet use comes an abundance of applications requiring usernames and passwords entered via mobile devices. While the use of mobile devices is extremely convenient; they are also proving to be a security risk, allowing users to enter passwords in crowded locations where other people can oversee the passwords they are typing. Bystanders may watch the keystrokes that a user makes on their wireless device or may observe the screen of the wireless device. Consider the difficulty of entering a password for a web application via a cell phone on a crowded street, airport, or subway while being certain nobody is observing your keystrokes.

Currently, some keypads of wireless devices have an electronic output that can only be seen by the user directly in front of it. In other wireless devices the input keypad scrambles the entry data of each key on the keypad so that it is different each time. For example, during each data entry session the numerical button for "1" corresponds to a different key. These methods, however, are expensive and impractical for mobile devices, as they are expensive and cumbersome for users.

Accordingly, there exists a need for a secure yet easy method of securely entering information via mobile devices.

SUMMARY OF THE INVENTION

Exemplary embodiments include a system for secure input for a mobile device including: a input device for receiving an input from a user; a sensor for determining the status of the mobile device; and a processor in operable communication with the input device and the sensor, wherein the processor alters the input received from the user responsive to the status of the mobile device.

Exemplary embodiments also include a method for providing secure input for a mobile device including: receiving an input signal from a user; receiving a status signal from a sensor; altering the input signal responsive to the status signal; and transmitting the altered input signal.

Further exemplary embodiments include a computer program product for providing secure input for a mobile device, the computer program product including: a storage medium readable by a processing circuit and storing instructions for execution by the processing circuit for facilitating a method including: receiving an input signal from a user; receiving a status signal from a sensor; altering the input signal responsive to the status signal; and transmitting the altered input signal.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effects

As a result of the summarized invention, technically we have achieved a solution that allows a user to enter information into a mobile device such that the information input cannot be interpreted by a third party watching the user enter the information.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
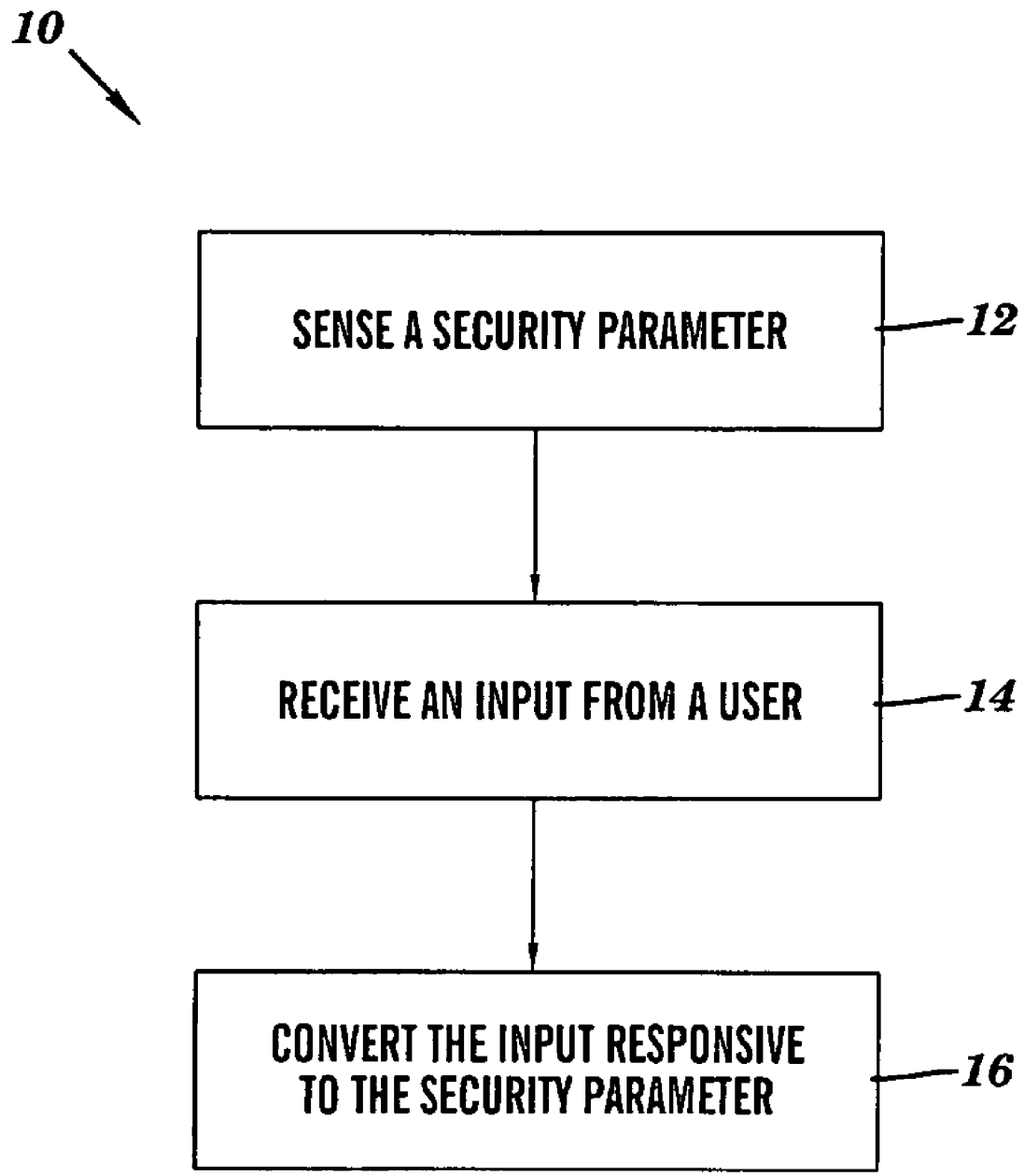
FIG. 1 illustrates flow chart depicting a method of securely entering information into a mobile device in accordance with exemplary embodiments.

Referring to FIG. 1, a flow chart depicting a method of securely entering information into a mobile device is referred to generally as 10. The first step in the method 10 is to sense a security parameter, as shown at step 12. After sensing the security parameter, the method 10 receives an input from a user, as shown at step 14. The user input is then converted to an actual input responsive to the security parameter, as shown in step 16. In exemplary embodiments, the user input may be received from any input device including, but not limited to, a numerical pad, an alphanumeric pad, a stylus, a touch screen device, or the like. Likewise, the security parameter can include, but is not limited to, an orientation sensor (e.g., a tilt sensor), a security button, a security code, or the like.

In one embodiment, a mobile device can utilize a tilt sensor to mask secure text input on the mobile devices. The tilt sensor may be operated as application software that can be activated automatically or triggered manually. In the automatically triggered mode, the mobile device listens to the input received from a user via the input device and, if the tilt sensor indicates that the mobile device is being used in a secure mode, the mobile device translates the data input. After translating the data input, the mobile device then transmits the data to the requesting application or website. In one embodiment, the secure input software runs as a background task on the mobile device. When the secure input software is not activated for security, the mobile device simply listens to keystrokes input and transmits them to the requesting application.

Figure 2:
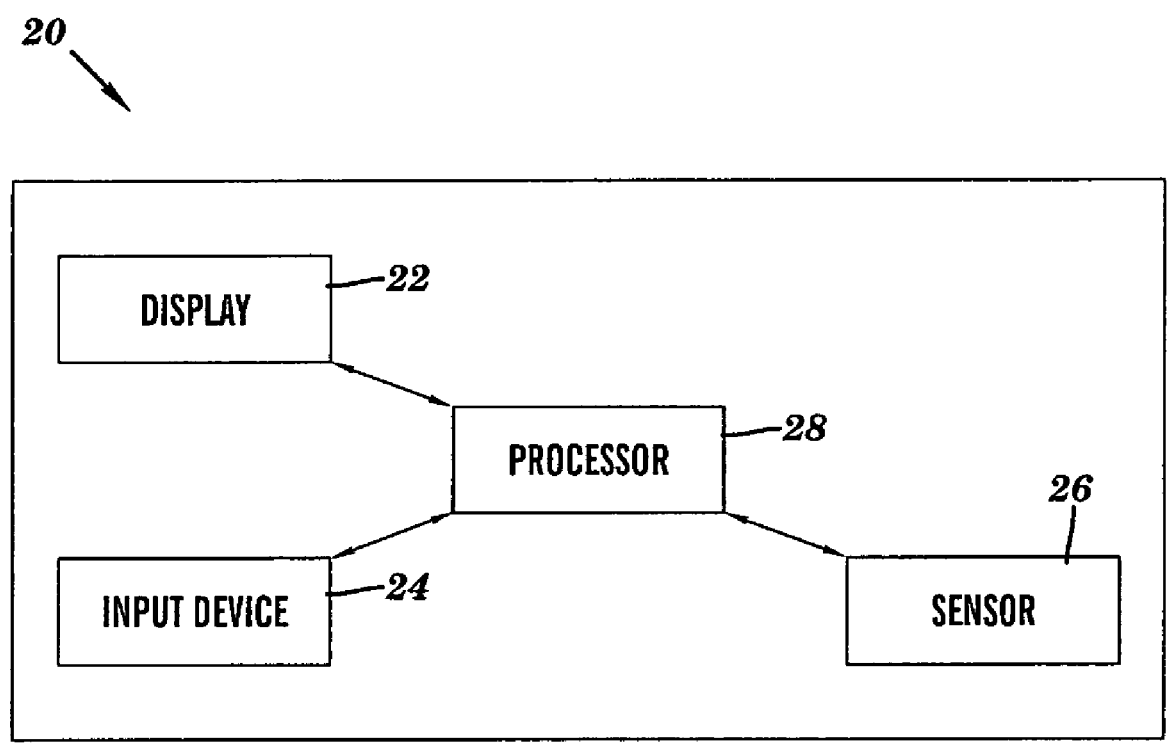
FIG. 2 illustrates a block diagram of an exemplary mobile device in accordance with exemplary embodiments.

Referring now to FIG. 2, an exemplary mobile device 20 is illustrated. The mobile device includes a display 22, a input device 24, and a sensor 26, which are all in operable communication with a processor 28. The display 22 may include, but is not limited to, an LCD display, an EL display, or the like. Likewise, the input device 24 may include, but is not limited to, a numerical pad, an alphanumeric pad, a stylus, a touch screen device, or the like. The sensor 26 may include, but is not limited to, a tilt sensor, a noise sensor, a position sensor, or the like. The input device 24 provides data input from a user to the processor 28, which checks the corresponding status of the sensor 26. Depending upon the status of the sensor 26, the processor 28 may alter the data input by the user. In exemplary embodiments, the processor 28 executes secure input software to translate input data based upon information received from the sensor 26.

As mentioned above, the secure input software may be triggered either automatically or manually. For example, in the case of automatic triggering, the secure input, software recognizes password text entry fields and other secure fields. When the cursor is placed in such a field for text entry, the secure input software is automatically triggered. Additionally, the user can configure the secure input software to recognize particular websites and applications, and activate automatically when these sites are encountered. In exemplary embodiments, the secure input software may be intelligently able to automatically determine situations that require more security. For example, hardware and software within the mobile device may be able to detect an elevated ambient noise level (e.g., through the use of a microphone) and, if a user is in a public situation with many people an identifiable audio pattern may be present. The mobile device may automatically recognize such environments and activate the secure input software. In other exemplary embodiments other external factors may be used to activate the secure input software. For example, movement of the mobile device can be detected to determine transportation via a train or subway and a GPS location can indicate that the mobile device is within insecure public areas.

In the case of manual triggering, the secure input software can be triggered via a hotkey when the user wishes to securely mask text input. Once activated, the—The secure input software may mask input data entry before transmitting it by using a tilt sensor to determine the text translation. In an exemplary embodiment, the direction of the tilt directly translates the keystroke to the key located adjacent in the tilt direction. For example when using a QWERTY keyboard for an input device, entering 'A' while tilting the mobile device forward will result in the letter 'Q' being buffered by the secure input software and forwarded to the requesting application. Likewise, tilting the mobile device back, left, and right will translate the input data in a similar manner. The tilt sensing in multiple directions provides an additional layer of complexity to help avoid an onlooker from mentally processing both text entry and tilt direction in a casual setting.

Some situations or environments may require greater security to prevent persistent or well-prepared onlookers from observing text/tilt combinations. In such situations, the secure input software may contain a configurable profile that is used to determine text input translation. For example, the user could configure a right tilt to translate text entry 2 positions to the right, a tilt forward to provide caps, or even have a tilt position such as back automatically translate any character to an 'A' to further disguise the text input. In exemplary embodiments, the degree of tilt sensed may be used to determine the amount of translation. For example, a tilt of less than ten degrees may indicate no translation, a tilt between ten and twenty degrees may indicate a one-character translation, and a tilt of greater than twenty degrees may indicate a two-character translation.

In other embodiments, the use of decoy entries can be used to provide an additional layer of security for entering data into a mobile device. For example, every $x^{th}$ input character the secure input software may indicate to the user that the next input character will be a decoy. In exemplary embodiments, the decoy indication can be a small icon on the display of the mobile device. Accordingly, the decoy input can be any character because it will be ignored by the secure input software, but will seem to an onlooker to be a valid entry. An additional decoy that may be used by the secure input software is the use of multiple tilts performed sequentially for a character input. For example, the secure input software may only recognize the $x^{th}$ tilt direction as a valid security parameter input. As such, if a user has configured the system to use the $2^{nd}$ tilt direction for each character, he or she can hold down 'g', and then tilt the mobile device forward, left, and then right. On the 2nd tilt direction (left) will be used by the system to translate the 'g' to a 'd' (on a QWERTY keypad), while an onlooker does not know which tilt direction is used for the translation.

In exemplary embodiments, the tilt sensing is performed by accelerometers, which are becoming increasingly sensitive and can detect very subtle changes in tilt. As such, the tilt of the mobile device can be slight enough for the secure input software to detect, but not be visually discernible to an onlooker. Furthermore, as a user becomes comfortable with the secure input, their speed of entry will increase to the point that the complexity of watching both the data input and trying to observe a subtle tilt detection will make it nearly impossible to accurately translate the entry by an onlooker.

One of the advantages of the secure input software is that the user is provided extra security in crowded environments to enter secure text such as passwords. The secure input software adds visual complexity to mask the text input from onlookers, yet to the user who knows the tilt-translation scheme, it remains straightforward and easy to input secure text via tilt-translation. Furthermore, the configuration options can provide different layers of security for different settings, and the software's automatic and manual triggering mechanism makes it easy and seamless to switch between secure tilt-translation and regular text input.

In other exemplary embodiments, the tilt-sensing technology may be used to display different input codes on the screen of the mobile device based on the tilt of the mobile device. For example, as the user tilts the mobile device different input codes can be presented on the screen to the user and as the user is inputting data additional keystrokes would be added based on the displayed input code. An onlooker would have a difficult time reading the screen, watching the input buttons, monitoring the tilt of the device, and distinguishing between which inputs correspond to the password and which ones do not.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention.

The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for secure input for a mobile device comprising:
    a input device for receiving an input from a user, the input device having a keypad having a plurality of alphabetic keys;
    a sensor for determining an status of the mobile device, wherein the sensor is a tilt sensor; and
    a processor in operable communication with the input device and the sensor, wherein the processor provides a secure input to the mobile device by altering the input received from the user responsive to the status of the mobile device sensed by the tilt sensor;
    wherein the processor translates an entered keystroke to a translated keystroke in response to a degree of tilt of the mobile device, wherein a tilt of less than a first degree value results in no translation of the entered keystroke, a tilt equal to the first degree value and less than a second degree value results in translating the entered keystroke by one key along the keypad in the direction of tilt and a tilt equal to or greater than the second degree value results in translating the entered keystroke by two keys along the keypad in the direction of tilt.

2. The system of claim 1, wherein the input from the user is text.

3. The system of claim 1, wherein the status of the mobile device includes a spatial orientation of the mobile device.

4. The system of claim 3, wherein the input device is a QWERTY keyboard.

5. The system of claim 4, further comprising a display in operable communication with the processor, wherein the display displays an altered input received from the processor.

6. A method for providing secure input for a mobile device comprising:
    receiving an input signal from a user throw having n a plurality of alphabetic keys;
    receiving a status signal from a sensor, wherein the sensor is a tilt sensor;
    securing input to the mobile device by altering the input signal responsive to the status signal sensed by the tilt sensor; and
    wherein the altering translates an entered keystroke to a translated keystroke in response to a degree of tilt of the mobile device, wherein a tilt of less than a first degree value results in no translation of the entered keystroke, a tilt equal to the first degree value and less than a second degree value results in translating the entered keystroke by one key along the keypad in the direction of tilt and a tilt equal to or greater than the second degree value results in translating the entered keystroke by two along the keypad in the direction of tilt;
    transmitting the altered input signal.

7. The method of claim 6, wherein the status signal is indicative of a spatial orientation of the mobile device.

8. The method of claim 7, wherein the input signal is received from an input device.

9. The method of claim 8, wherein the input device is a QWERTY keyboard.

10. A computer program product for providing secure input for a mobile device, the computer program product comprising:
    a storage medium readable by a processing circuit and storing instructions for execution by the processing circuit for facilitating a method comprising:
    receiving an input signal from a user through an input device having a keypad having a plurality of alphabetic keys;
    receiving a status signal from a sensor, wherein the sensor is a tilt sensor;
    securing input to the mobile device by altering the input signal responsive to the status signal sensed by the tilt sensor;
    wherein the altering translates an entered keystroke to a translated keystroke in response to a degree of tilt of the mobile device, wherein a tilt of less than a first degree value results in no translation of the entered keystroke, a tilt equal to the first degree value and less than a second degree value results in translating the entered keystroke by one key along the keypad in the direction of tilt and a tilt equal to or greater than the second degree value results in translating the entered keystroke by two characters keys along the keypad in the direction of tilt;
    transmitting the altered input signal; and wherein the sensor is a tilt sensor, the status signal is indicative of a spatial orientation of the mobile device, and the input signal is received from a QWERTY keyboard.

11. The computer program product of claim 10, wherein the spatial orientation of the mobile device is indicative of a desired directional translation of the input signal from the QWERTY keyboard.

12. The computer program product of claim 11, wherein the tilt sensor provides for the indication of multiple translations of a single keystroke received from the QWERTY keyboard.

13. The computer program product of claim 10, wherein the spatial orientation of the mobile device indicates the input signal received from the QWERTY keyboard is a dummy character.

* * * * *